(12) United States Patent
Wang

(10) Patent No.: US 7,751,187 B2
(45) Date of Patent: Jul. 6, 2010

(54) FOLDABLE ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 24 days.

(21) Appl. No.: 12/197,322

(22) Filed: Aug. 25, 2008

(65) Prior Publication Data
US 2010/0020491 A1      Jan. 28, 2010

(30) Foreign Application Priority Data
Jul. 25, 2008      (CN) .................. 2008 1 0303061

(51) Int. Cl.
*G06F 1/16* (2006.01)

(52) U.S. Cl. ............... 361/679.58; 292/99; 292/8

(58) Field of Classification Search ............ 361/679.58; 292/99, 8
See application file for complete search history.

(56) References Cited

U.S. PATENT DOCUMENTS

| | | | | |
|---|---|---|---|---|
| 6,570,757 B2* | 5/2003 | DiFonzo et al. | ........ | 361/679.27 |
| 7,407,202 B2* | 8/2008 | Ye et al. | .......... | 292/251.5 |
| 7,609,514 B2* | 10/2009 | Doczy et al. | ........... | 361/679.58 |
| 2004/0032708 A1* | 2/2004 | Lo | ............ | 361/681 |
| 2006/0133019 A1* | 6/2006 | Yamazaki et al. | ............ | 361/683 |
| 2009/0140531 A1* | 6/2009 | Lee | ............ | 292/99 |
| 2009/0168342 A1* | 7/2009 | Tang | ............. | 361/679.58 |
| 2009/0190306 A1* | 7/2009 | Tang | ............. | 361/679.58 |

* cited by examiner

*Primary Examiner*—Lisa Lea-Edmonds
(74) *Attorney, Agent, or Firm*—Zhigang Ma

(57) ABSTRACT

An exemplary foldable electronic device includes a first cover, a second cover coupled to the first cover and a latch mechanism. The latch mechanism includes a hooking portion disposed on the first cover and a latching portion disposed in the second cover and arranged corresponding to the hooking portion. The latching portion includes a button, a latch fixed relative to the button, and an elastic member disposed between the second cover and the button. The button partially protrudes out of the second cover and is slidable relative to the second cover. The button and the elastic member are capable of moving the latch latching with, or unlatching from, the hooking portion.

18 Claims, 6 Drawing Sheets

US 7,751,187 B2

FOLDABLE ELECTRONIC DEVICE

BACKGROUND OF THE INVENTION

1. Field of the Invention

The present invention generally relates to foldable electronic devices and, particularly, to a foldable electronic device having a top cover and a main body.

2. Discussion of the Related Art

Referring to FIGS. 5 and 6, a typical housing 80 of a foldable electronic device is shown. The housing 80 includes a main body 81, a top cover 82, a sliding member 83, a hook 84, and a spring 85. A latching groove 811 is defined in the main body 81 and the latching groove 811 is adjacent to a side of the main body 81. A rectangular mounting groove 821 is defined in a side of the top cover 82 and the top cover 82 forms a resisting member 823 that is adjacent to the mounting groove 821. The sliding member 83 is disposed in the mounting groove 821 and is capable of sliding, left or right, along the mounting groove 821. The hook 84 is configured to be latched in the latching groove 811. The hook 84 includes an end that is fixed to the sliding member 83 so that the hook 84 is movable together with the sliding member 83. One end of the spring 85 abuts the resisting member 823 and the other end of the spring 85 abuts the hook 84 so that the hook 84 and the sliding member 83 are normally forced to remain on the left side of the mounting groove 821.

To open the top cover 82, a user has to slide the sliding member 83 towards the right side of the mounting groove 821. However, the sliding member 83 is generally designed to be inconspicuous, thereby having a small outer surface area and the outer surface of the sliding member 83 may line up with the surface of the edge (side) of the cover. Thus when sliding the sliding member 83 with a finger, to open the top cover 82, the finger may slip on the sliding member 83. As a result, opening the top cover 82 is bothersome.

Therefore, a new foldable electronic device is desired in order to overcome the above-described shortcomings.

SUMMARY

An exemplary foldable electronic device includes a first cover, a second cover coupled to the first cover and a latch mechanism. The latch mechanism includes a hooking portion disposed on the first cover and a latching portion disposed in the second cover and arranged corresponding to the hooking portion. The latching portion includes a button, a latch fixed relative to the button, and an elastic member disposed between the second cover and the button. The button partially protrudes out of the second cover and is slidable relative to the second cover. The button and the elastic member are capable of moving the latch for latching with, or unlatching from, the hooking portion.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present foldable electronic device. Moreover, in the drawings, like reference numerals designate corresponding parts throughout several views, and all the views are schematic.

DETAILED DESCRIPTION OF THE EMBODIMENTS

Reference will now be made to the drawings to describe an exemplary embodiment of the present foldable electronic device in detail.

The present foldable electronic devices may be notebooks, cell phones, media players, and so on. In the exemplary embodiment, a notebook is taken as exemplary device to describe the foldable electronic device of the present invention.

Figure 1:
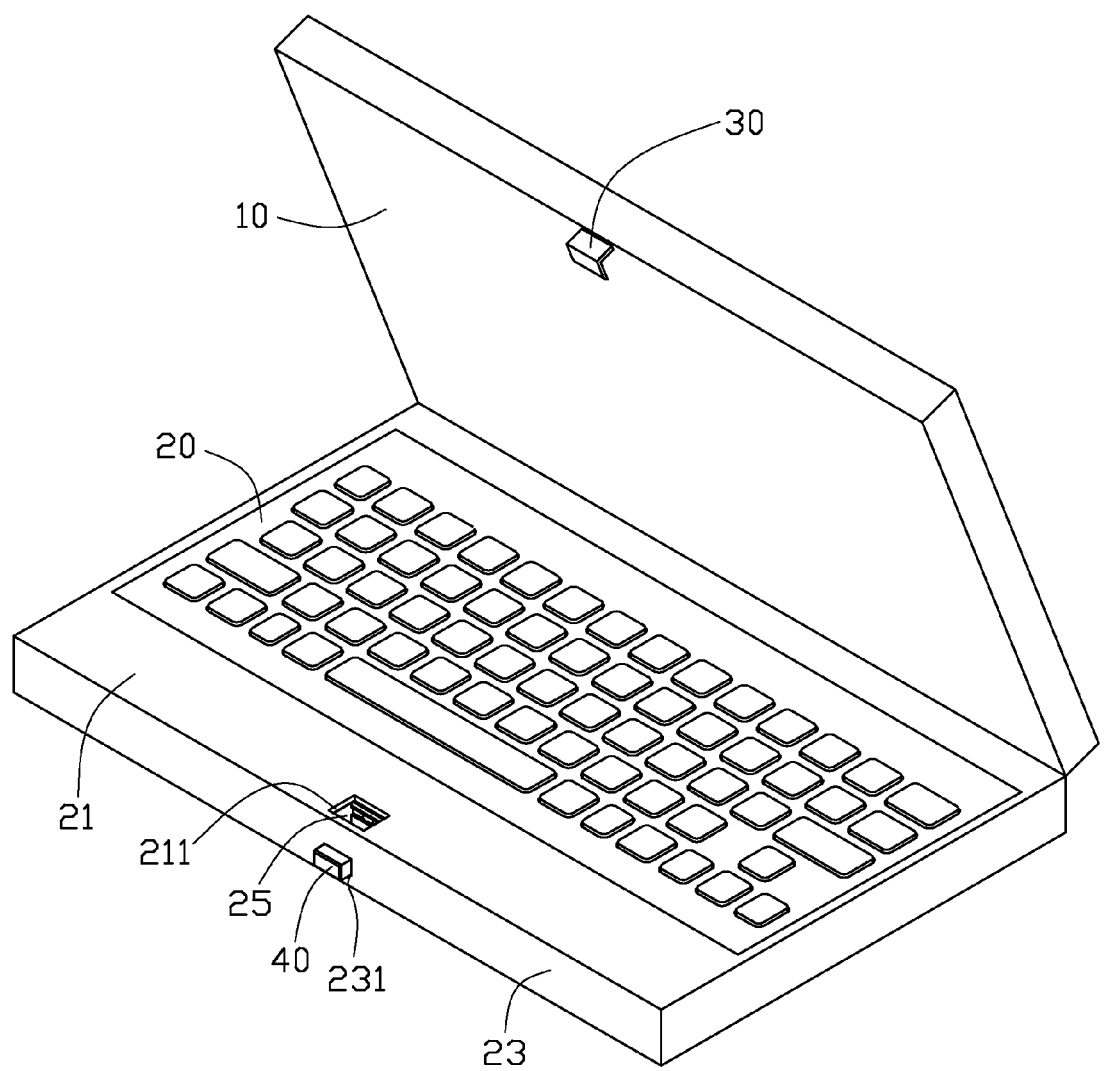
FIG. 1 is an assembled, isometric view of a foldable electronic device in accordance with an exemplary embodiment of the present invention.

Referring to FIG. 1, a notebook (not labeled) includes a top cover 10, a main body 20, and a latch mechanism (not labeled) disposed between the top cover 10 and the main body 20. The top cover 10 is rotatably mounted to the main body 20. The latch mechanism includes a hooking portion 30 disposed on the top cover 10 and a latching portion 40 disposed on the main body 20.

The main body 20 has a first surface 21 and a second surface 23 adjoining the first surface 21. The main body 20 defines a first slot 211 in the first surface 21 and a second slot 231 in the second surface 23. The first slot 211 and the second slot 231 communicates with each other, thus forming a receptacle 25. The main body 20 has a fixing plate 251 (shown in FIG. 3) defining the receptacle 25.

Figure 2:
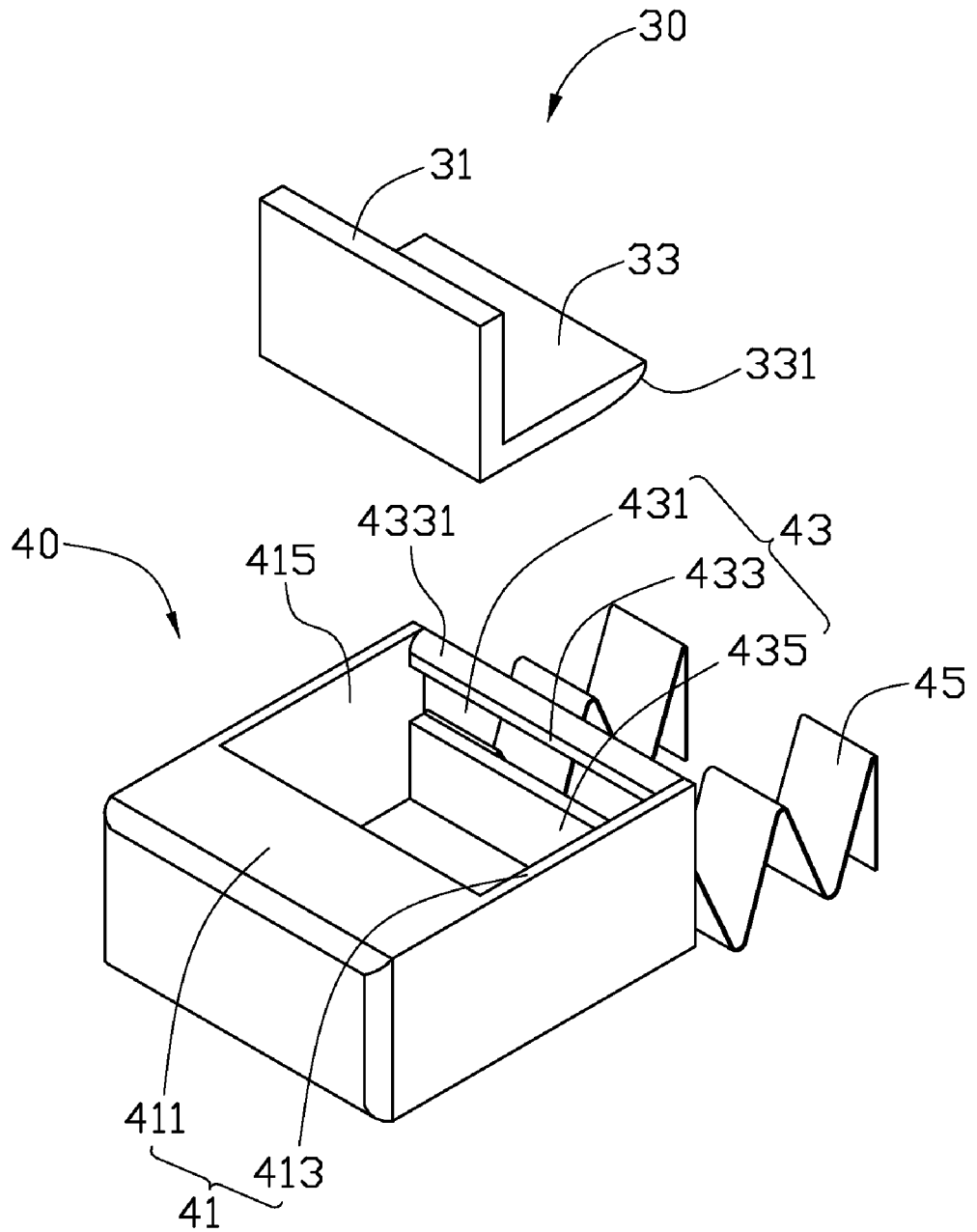
FIG. 2 is a partial, exploded, and isometric view of a hooking portion and a latching portion the foldable electronic device in FIG. 1.

Referring to FIG. 2, the hooking portion 30 includes a connecting plate 31 and an engaging plate 33 substantially perpendicularly extending from an edge of the connecting plate 31. An end of the engaging plate 33 defines a curved guiding surface 331. The hooking portion 30 is fixed at one edge of the top cover 10 and aligned correspondingly to the first slot 211. The guiding surface 331 is facing away from the edge of the top cover 10. In the embodiment, the guiding surface 331 is a curved surface. Alternatively, the guiding surface 331 may be an inclined surface.

The latching portion 40 includes a button 41, a latch 43, and an elastic member 45. The button 41 is substantially a cuboid having a pressing portion 411 and a connecting portion 413. The connecting portion 413 defines a receiving slot 415. The latch 43 is fixed at an end of the connecting portion 413 of the button 41, opposite to the pressing portion 411. The latch 43 includes a top plate 433 and a bottom plate 435. A gap 431 is defined between the top plate 433 and the bottom plate 435. The top plate 433 defines a guiding surface 4331 at a side opposite to the gap 431. In the embodiment, the guiding surface 4331 is a curved surface. Alternatively, the guiding surface 4331 may be an inclined surface. The latch 43 may be integrally formed with the button 41 or separately formed from the button 41. The elastic member 45 may be a compression helical spring, a leaf spring, a rubber rod etc. In this embodiment, the elastic member 45 is a leaf spring. An end of the elastic member 45 is configured to be fixed to the latch 43, and the other end of the elastic member 45 is configured to be fixed to the fixing plate 251 (shown in FIG. 3) of the main body 20. During assembly, the latching portion 40 is received in the receptacle 25 with a part of the button 41 protruding out of the receptacle 25 of the main body 20 via the second slot 231 and the end of the elastic member 45 fixed to the main body 20. Alternatively, ends of the elastic member 45 may not be fixed to the main body 20 and the latch 43, instead, ends of the elastic member 45 abut the two components respectively.

Figure 3:
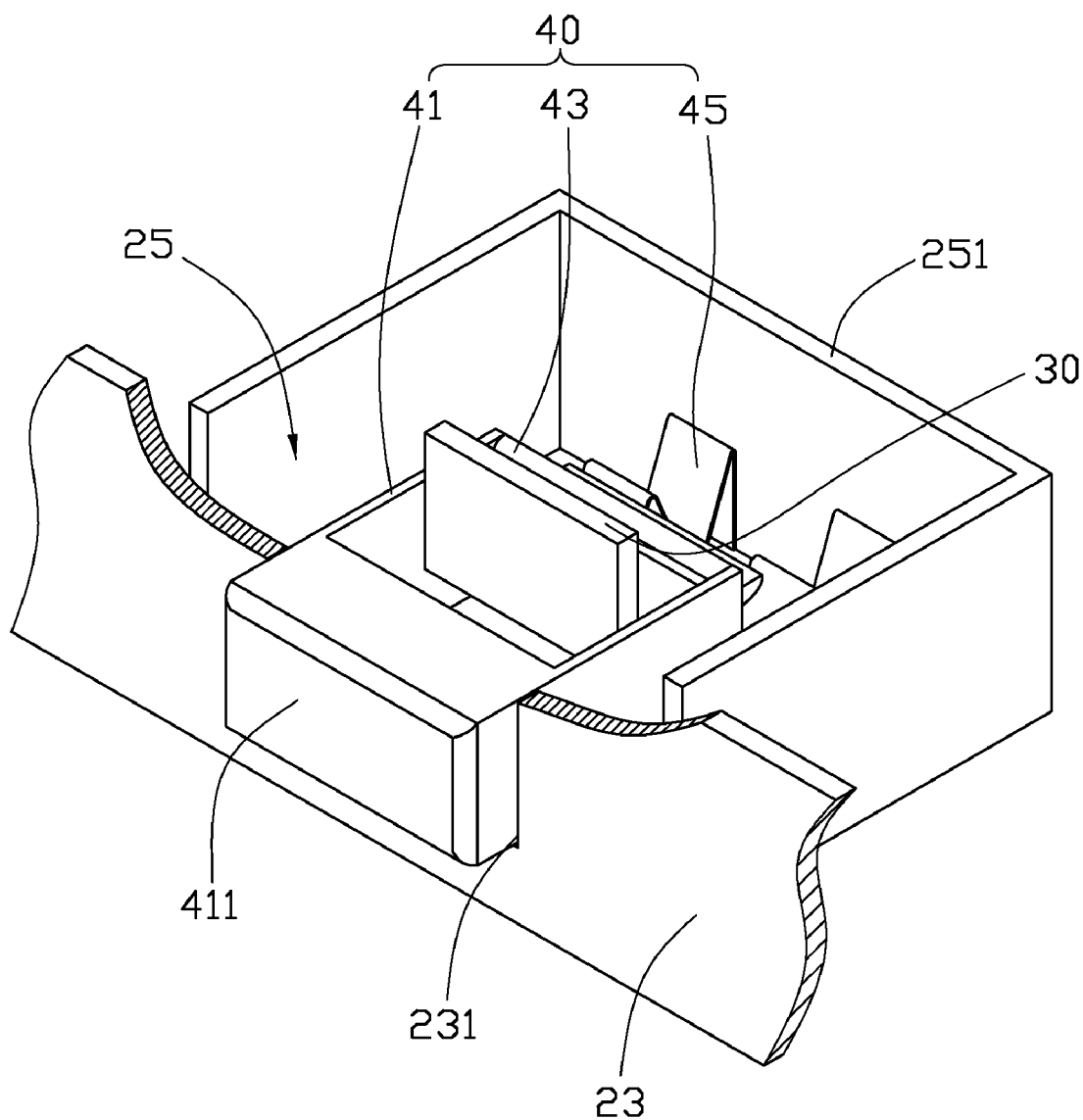
FIG. 3 is an isometric view showing the hooking portion being latched with the latching portion of the foldable electronic device in FIG. 1.

Referring also to FIG. 3, to fold the top cover 10 over the main body 20, an external force is applied to the top cover 10 to push the top cover 10 towards the main body 20, the hooking portion 30 enters the receptacle 25 of the main body 20 and moves inwards the main body 20 away from the first surface 21. The guiding surface 331 of the hooking portion 30 pushes against the guiding surface 4331, thereby, driving the latching portion 40 further into the receptacle 25 away from the second surface 23, as a result the elastic member 45 becomes compressed. A deforming direction of the elastic member 45 is the same as a moving direction of the button 41. When the engaging plate 33 of the hooking portion 30 moves passing the guiding surface 4331, portion of engaging plate 33 including the guiding surface 331 slides into the gap 431 of the latching portion 40, thereby latching the top cover 10 with the main body 20.

Figure 4:
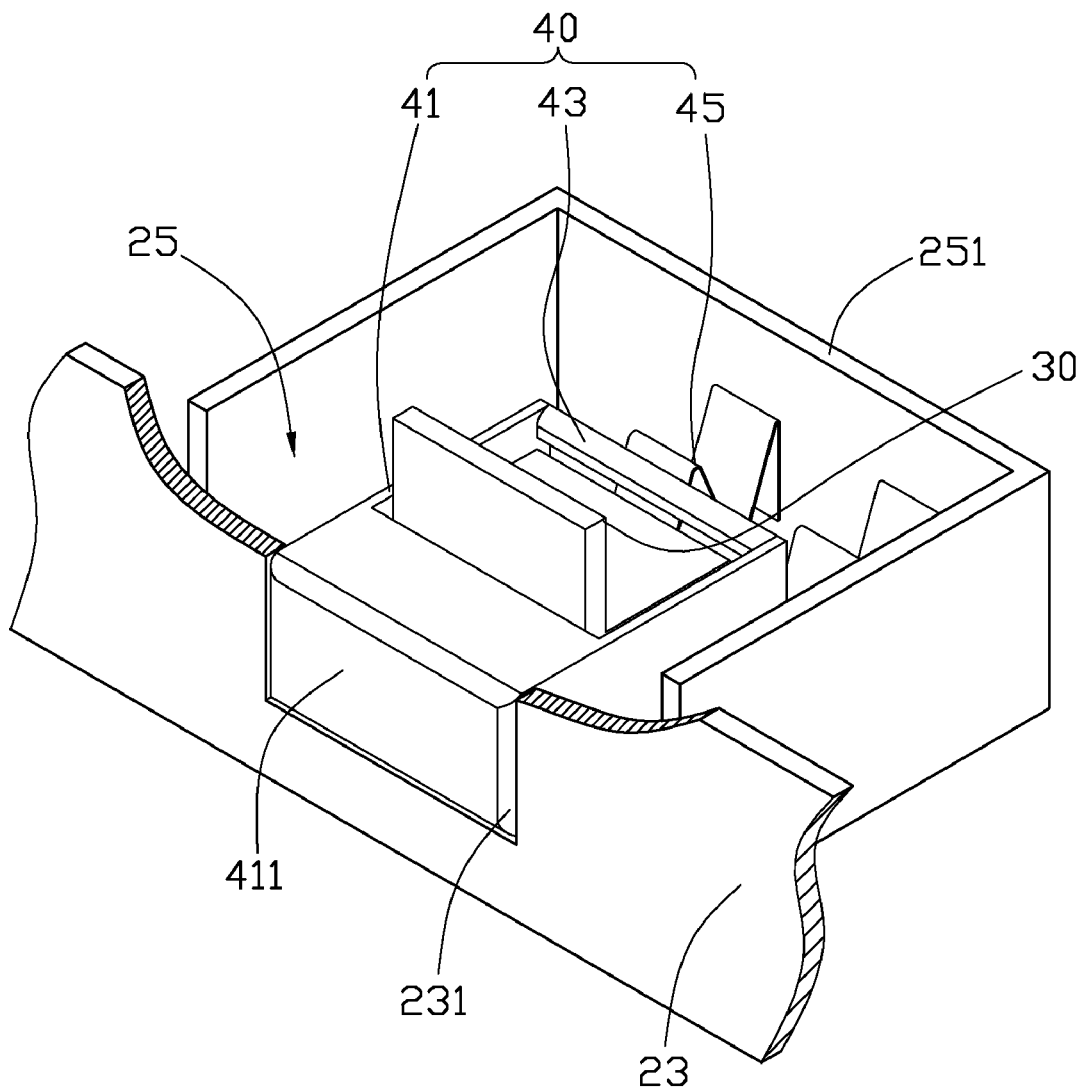
FIG. 4 is similar to FIG. 3, but showing the hooking portion being unlatched from the latching portion.
Figure 5:
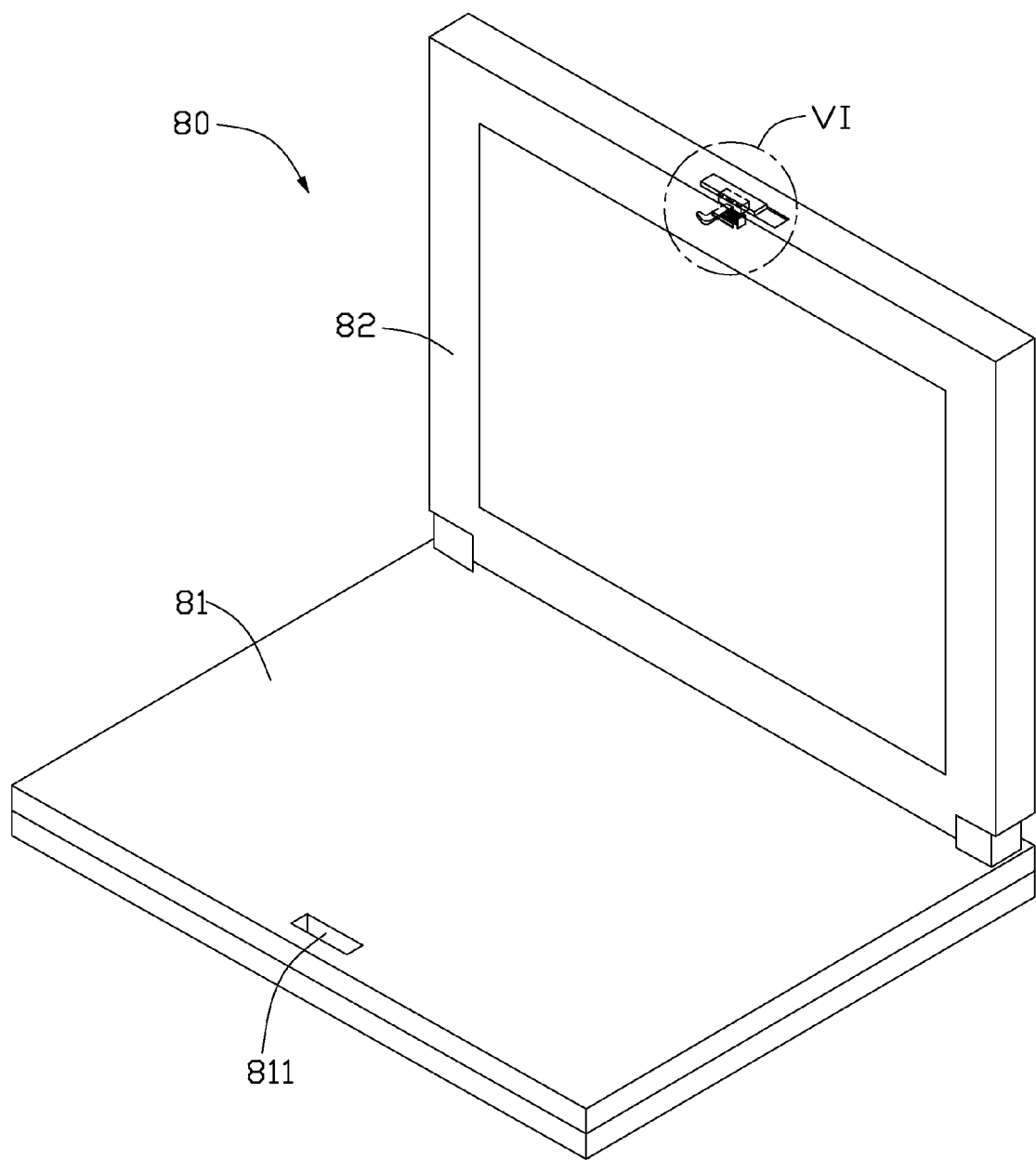
FIG. 5 is an isometric view of a related-art housing of a foldable electronic device.
Figure 6:
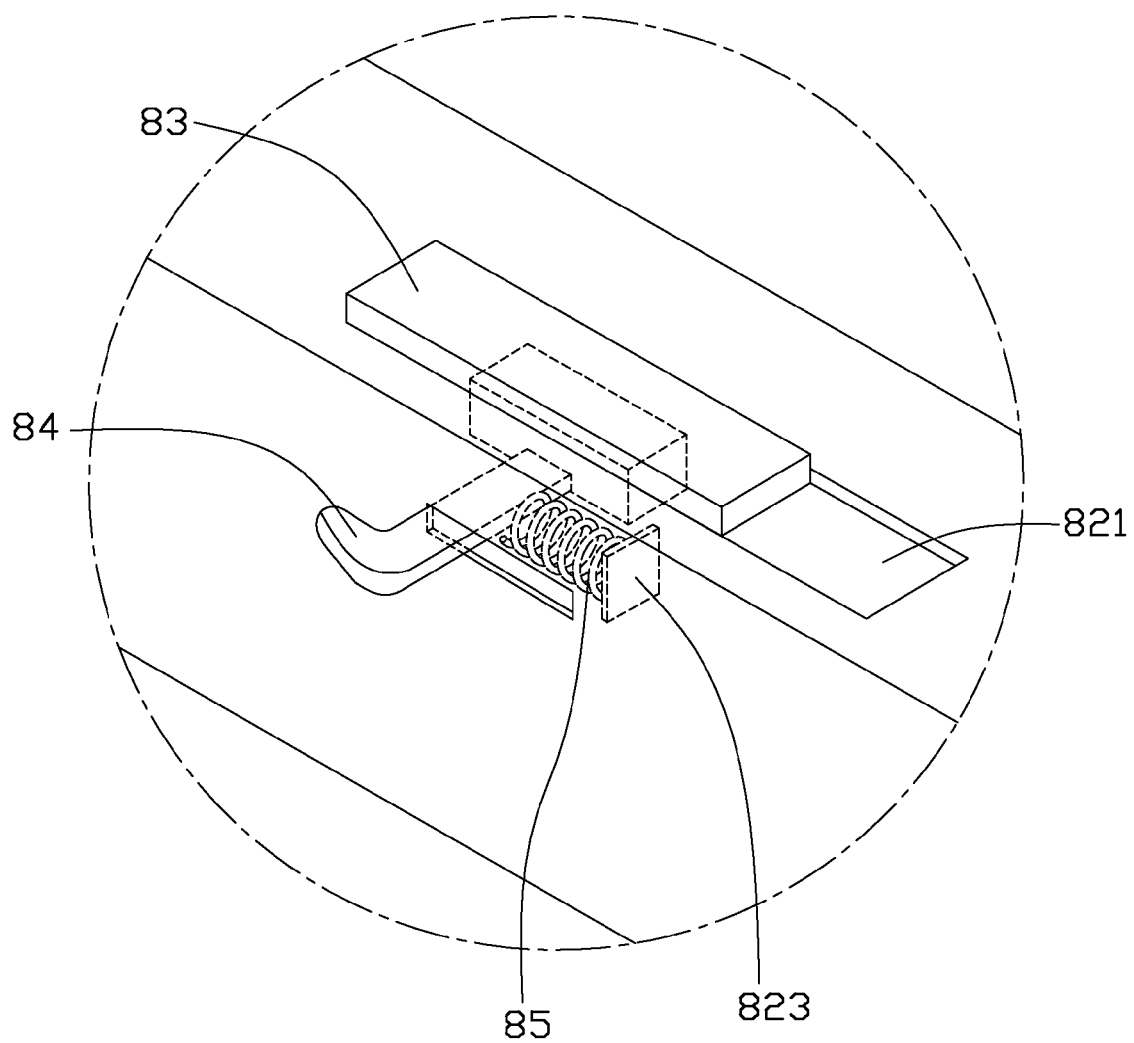
FIG. 6 is an enlarged view of the circled portion VI in FIG. 5.

Referring to FIG. 4, to open the top cover 10 from the main body 20, an external force is applied on the button 41 to push the latching portion 40 to slide further into the receptacle 25, thereby compressing the elastic member 45. The button 41 is pushed to the extent that the engaging plate 33 is no longer received in the gap 431 and furthermore not restricted by the top plate 433, thus the engaging plate 33 can be freed from the latching portion 40 and the hooking portion 30 is capable of disengaging from the latching portion 40, thus the top cover 10 can be unfolded open relative the main body 20.

When the top cover 10 is needed to be folded opened (release from the main body 20), only a procedure of pushing the button 41 is needed. Therefore, the top cover 10 can be easily flipped open.

In alternative embodiments, the hooking portion 30 may be disposed on the main body 20 and the latching portion 40 may be formed on the top cover 10. The elastic member 45 may be connected on the button 41.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A foldable electronic device, comprising:
   a first cover;
   a second cover rotatably coupled to the first cover; and
   a latch mechanism comprising a hooking portion disposed on the first cover and a latching portion disposed in the second cover and arranged corresponding to the hooking portion, and the latching portion comprising a button, a latch fixed relative to the button, and an elastic member disposed between the second cover and the button;
   wherein the hooking portion is a hook including a connecting plate and an engaging plate substantially perpendicularly extending from an edge of the connecting plate, the button is substantially a cuboid having a pressing portion and a connecting portion, the connecting portion defines a receiving slot for receiving the hooking portion, the latch is fixed at an end of the connecting portion of the button, the latch includes a top plate and a bottom plate and defines a gap between the top plate and the bottom plate for engaging with the engaging plate of the hooking portion, the button partially protrudes out of the second cover and is slidable relative to the second cover, the button and the elastic member are capable of moving the latch for latching with, or unlatching from, the hooking portion.

2. The foldable electronic device as claimed in claim 1, wherein an end of the engaging plate of the hooking portion defines a guiding surface, the latch has a guiding surface for resisting the guiding surface of the hooking portion.

3. The foldable electronic device as claimed in claim 2, wherein the hooking portion is fixed at an edge of the top cover, the guiding surface is facing away from the edge of the top cover, and the guiding surface of the hooking portion is a curved surface or an inclined surface.

4. The foldable electronic device as claimed in claim 2, wherein the top plate of the latch defines the guiding surface at a side opposite to the gap, and the guiding surface of the top plate is a curved surface or an inclined surface.

5. The foldable electronic device as claimed in claim 2, wherein the elastic member is a leaf spring, and an end of the elastic member is fixed to latch, and the other end of the elastic member is fixed to the second cover.

6. The foldable electronic device as claimed in claim 5, wherein the second cover has a first surface and a second surface adjoining to the first surface, the second cover defines a first slot in the first surface and a second slot in the second surface, the first slot and the second slot communicates with each other, thus forming a receptacle, a part of the button protruding out of the receptacle via the second slot, the elastic member, the latch and the rest of the button are received in the receptacle.

7. The foldable electronic device as claimed in claim 6, wherein the second cover has a fixing plate defining the receptacle, together with the first slot and the second slot, one end of the elastic member is fixed to the fixing plate of the second cover.

8. A latch mechanism for a foldable electronic device including a first cover and a second cover, comprising:
   a hooking portion disposed on the first cover; and
   a latching portion disposed in the second cover, and the latching portion comprising a button, a latch fixed relative to the button, and an elastic member disposed between the second cover and the button, the latching portion being arranged corresponding to the hooking portion, the button has a pressing portion and a connecting portion;
   wherein the button and the elastic member are capable of moving the latch for latching with, or unlatching from, the hooking portion, when moves to latch with or unlatch from the hooking portion, the pressing portion of the button moves outwards or inwards the second cover, the latching portion and the hooking portion are non-deformable.

9. The latch mechanism as claimed in claim 8, wherein the hooking portion is a hook including a connecting plate and an engaging plate substantially perpendicularly extending from an edge of the connecting plate.

10. The latch mechanism as claimed in claim 9, wherein an end of the engaging plate of the hooking portion defines a guiding surface, the latch has a guiding surface for resisting the guiding surface of the hooking portion.

11. The latch mechanism as claimed in claim 10, wherein the hooking portion is fixed at an edge of the top cover, the guiding surface is far away from the edge of the top cover, the guiding surface of the hooking portion is a curved surface or an inclined surface.

12. The latch mechanism as claimed in claim 11, wherein the latch defines a gap for engaging with the engaging plate of the hooking portion.

13. The latch mechanism as claimed in claim 12, wherein the button is substantially a cuboid, the connecting portion of the button defines a receiving slot for receiving the hooking portion, the latch is fixed at an end of the connecting portion of the button, the latch includes a top plate and a bottom plate, the gap is defined between the top plate and the bottom plate.

14. The latch mechanism as claimed in claim 13, wherein the top plate of the latch defines the guiding surface at a side opposite to the gap, and the guiding surface of the top plate is a curved surface or an inclined surface.

15. The latch mechanism as claimed in claim 13, wherein the elastic member is a leaf spring, and an end of the elastic member is fixed to latch.

16. The latch mechanism as claimed in claim 13, wherein the elastic member is a helical spring, and an end of the elastic member is fixed to the latch.

17. The latch mechanism as claimed in claim 13, wherein the elastic member is a rubber rod, and an end of the elastic member is fixed to the latch.

18. The latch mechanism as claimed in claim 8, wherein a deforming direction of the elastic member is the same as a moving direction of the button.

* * * * *